United States Patent [19]
Filippi

[11] 4,232,196
[45] Nov. 4, 1980

[54] VIDEO TELEPHONE APPARATUS

[76] Inventor: Frederico Filippi, Via Mazzini N. 40, Turin, Italy

[21] Appl. No.: 973,627

[22] Filed: Dec. 27, 1978

[51] Int. Cl.³ .......................................... H04M 11/08
[52] U.S. Cl. ................................ 179/2 TV; 358/108
[58] Field of Search .............. 358/85, 108; 179/2 TV, 179/2 DP, 2 A

[56] References Cited
U.S. PATENT DOCUMENTS
3,567,848  3/1971  Thies .................................. 179/2 TV FOREIGN PATENT DOCUMENTS
2014322  9/1971  Fed. Rep. of Germany ....... 179/2 TV
2122726  11/1972  Fed. Rep. of Germany ....... 179/2 TV Primary Examiner—Bernard Konick
Assistant Examiner—Joseph A. Popek
Attorney, Agent, or Firm—Browdy and Neimark

[57] ABSTRACT

A video telephone apparatus useful at indoor positions includes a casing having a frontal wall and a longitudinal axis and a picture tube having an axis. The picture tube is positioned within the casing with its axis substantially parallel to the longitudinal axis of the casing. A hand-set having an axis and including a transmitter and a receiver with a handle portion therebetween is provided with an aperture in the handle portion. Seats are provided on the casing for allowing the hand-set to be removably positioned therein when not held by a user. A window is provided in the frontal wall of the casing, the window having a contour substantially identical to that of the aperture in the handle portion. The window is visible through the aperture when the hand-set is positioned in the seats. An image reflecting mirror is positioned in the casing between the picture tube and the window for reflecting images from the picture tube to make them viewable via the window and aperture.

7 Claims, 2 Drawing Figures

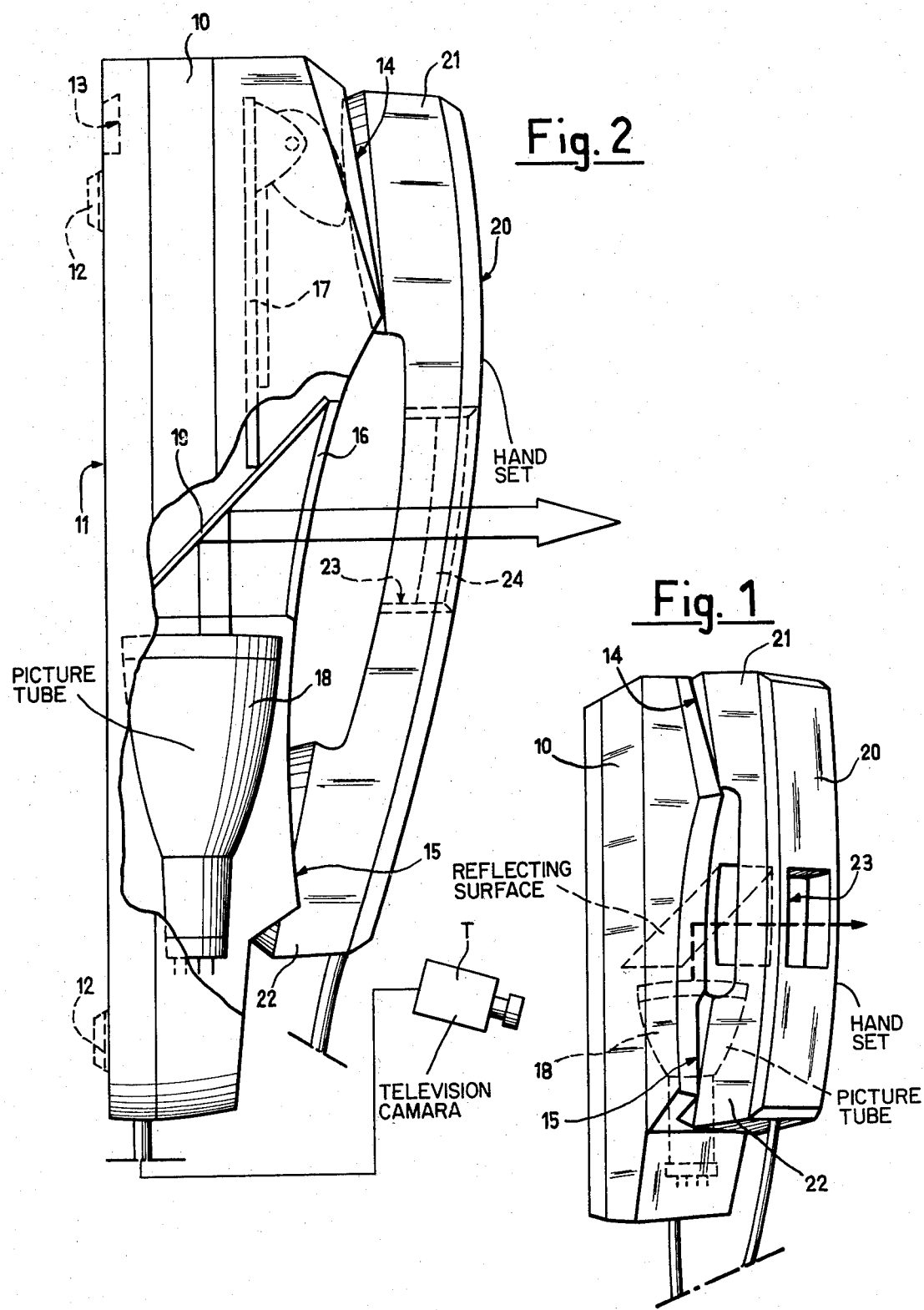

VIDEO TELEPHONE APPARATUS

BACKGROUND OF THE INVENTION

The present invention concerns an interphone apparatus for a voice and image transmission system, commonly and currently called as a video-interphone. In this type of installation, widely used at present time, a distinction is made between an external position which includes an interphone push-button pannel with a closed circuit television camera, and one or a plurality of indoor positions, each one including an interphone apparatus of the microtelephone type incorporating a so called "monitor", that is, a kinescope for the display of the images sent by the television camera from the external position.

Specifically, the present invention concerns the above said indoor positions, namely, the interphone apparatus and its operatively associated picture tube monitor.

At present time, the indoor positions include a casing, generally made of a polymeric or similar material, the casing having been formed to provide seats to contain and hook the microtelephone and the monitor screen, generally placed toward the side of the microtelephone. Behind the screen, the kinescope is placed with its axis perpendicular to the screen so that the monitor forms a small television apparatus placed toward the side of the microtelephone. The arrangement presents the drawback of a considerably encumbering size and generally requires the casing or container to be at least partially embedded, due to the remarkable extension of the kinescope, in order to reduce, at least partially, the protrusion of the container from the wall. This causes firstly a greater structural complication of the indoor position whose casing must include a metallic bottom portion for its embedding; further, a remarkably laborious installation which requires the preparation of an embedding seat in the wall and the masonry work for the embedding. Furthermore, the known indoor positions can not be easely transferred from one room to another room and particularly, they can not be used as so called table installations, that is installations wherein the interphonic apparatus forming the indoor position is simply resting on a support, as a bracket, a desk or other plane surface, as a conventional telephone hand-set apparatus.

SUMMARY OF THE INVENTION

The present invention, starting from knowledge of the above-mentioned shortcomings and drawbacks aims at their elimination. The invention has particularly the object of providing an indoor position, as specified, which has an extremely reduced encumbrance, substantially equal to that of a conventional microtelephone interphone, requires no embedding in a wall, is easely transferable and may also be used in desk installations.

In order to attain the foregoing objects and others, which are to be made clear from the following detailed specification, the present invention provides an interphone apparatus forming the indoor position of a video-interphone, as specified, whose essential particular feature resides in that it incorporates a kinescope, or monitor in the form of a picture tube placed with its axis parallel to tha longitudinal axis of the interphone apparatus, coincidently with the axis of the hand set portion when the same is in the hooked position, a reflecting surface to deviate the image and make it visible through a viewing window formed on the frontal wall of the interphone apparatus and perpendicularly to the projection direction of the kinescope.

According to the invention, the viewing window is placed on the frontal surface of the apparatus below the hand-set and the image is made visible through an the aperture formed in the handle of the hand set aperture having a contour coinciding with the contour of the showing window.

Since the kinescope and the viewing window have limited dimensions, it is advantageous if the latter, or the aperture formed in the handle of the hand-set is provided with a transparent screen having also the function of an enlargement lens.

BRIEF DESCRIPTION OF THE DRAWINGS

The invention will be better understood through the detailed following specification referred to the accompanying drawings, given only as a non limiting example and wherein:

FIG. 1 is a perspective view of an indoor interphone apparatus according to a preferred embodiment of the invention;

FIG. 2 is an elevation side view partially sectioned of the embodiment of FIG. 1.

DETAILED DESCRIPTION OF THE PREFERRED EMBODIMENT

With reference to FIGS. 1 and 2, numeral 10 indicates a video box-like body of the interphone and 20, its hand set. The body 10 has the usual conformation and comprises a bottom 11 which may be provided with resting feet 12 for removably placing the video interphone on a desk and one or more recessed seats 13 for the possible engagement of corresponding hooks or plugs suitable to allow installation of the video interphone on a wall. Two seats 14 and 15 are formed in a frontal wall of the body 10, for the engagements of a transmitter end 21 and a receiver end 22 of a hand-set 20. Conventional auricular and microphone modules are positioned with the respective ends 21, 22 of the hand set 20. Between the seats 14 an 15, in the central part of the body 10, there is formed a viewing window 16.

Inside the body 10 and correspondingly with the seat 15, near the end 22 opposite to the the end 21 which contacts a contact carrying plate 17, there is located a kinescope or monitor in the form of picture tube 18. The picture tube 18 is oriented with its axis parallel to the longitudinal direction of the body 10 and hence parallel to the hand-set 20 when it is engaged in the retaining seats 14 and 15.

The picture tube 18 projects the image, sent by a remotely positioned television camera T of the external position, on a reflecting surface 19, formed e.g. by a mirror, which reflects the same image making it visible through the viewing window 16 and an aperture 23 formed in the handle of the hand-set 20 when the hand-set 20 is positioned in the seats 14 and 15, when the hand-set 20 is removed from the seats 14 and 15, or when a user wishes to speak to an individual appearing on the monitor 18, the image appears in the viewing window 16.

The reflecting surface 19 is connected to the upper edge of window 16 and extends inside the body 10 in the space free of the contact carrying plate 17 and is inclined through 45° with respect to the axis of the picture tube 18. The viewing window 16 which will preferably be provided with protective transparent screen, is formed correspondingly with the hand-set 20 which, when hooked, is superimposed over the viewing window.

However as pointed out above, the window 16 is made visible by the presence of an aperture 23 formed on the handle of the hand-set 20 the aperture 23 having a contour coinciding with the contour of the viewing window 16.

Advantageously, as the picture tube 18 and the viewing window 16 have small dimensions, the aperture 23 will preferably be provided with a transparent screen 24 having the function of an enlargement lens. In the body 10 and preferably on the sides of the picture tube 18 there will be also located advantageously, with the interposition of multiple connectors, the reception and image formation conventional printed circuits (not shown).

I claim:

1. A video telephone apparatus useful at indoor positions, the apparatus comprising: a casing having a frontal wall and a longitudinal axis; a picture tube having an axis, said picture tube being positioned within said casing with its said axis substantially parallel to said longitudinal axis of said casing; a hand-set having an axis and including a transmitter; and a receiver with a handle portion therebetween; an aperture in said handle portion; seating means on said casing for allowing said hand-set to be removably positioned therein when not held by a user; a window in said frontal wall of said casing, said window having a contour substantially identical to that of said aperture in said handle portion and being visible through said aperture when said hand-set is positioned in said seating means; and image reflecting means positioned in said casing between said picture tube and said window for reflecting images from said picture tube to make them viewable via said window.

2. A video telephone apparatus according to claim 1, including a contact-carrying plate within said casing in the vicinity of one end thereof, said picture tube being positioned in the vicinity of a second end of said casing, and wherein said image reflecting means comprises a reflecting surface inclined with respect to said axis of said picture tube at substantially 45°, having an edge thereof positioned along an edge of said viewing window and extending inside said casing in free space between said contact-carrying plate and said picture tube.

3. A video telephone apparatus according to claim 1 or claim 2, including a transparent screen positioned in said window.

4. A video telephone apparatus according to claim 1 or claim 2, including an enlargement lens positioned in said aperture in said handle portion.

5. A video telephone apparatus according to claim 1 or claim 2, including feet means extending from said casing for allowing the apparatus to be movably positioned on a flat horizontal surface.

6. A video telephone apparatus according to claim 1 or claim 2, including at least one recessed seat, means in said casing for allowing engagement with corresponding at least one support member for allowing the apparatus to be positioned on a flat vertical surface.

7. A video telephone apparatus according to claim 1, including a contact-carrying plate positioned in said casing in vicinity of one end thereof, and a box-like body in said casing, said picture tube being positioned therein and said box-like body being fixed near a second end of said casing opposite said one end.

* * * * *